United States Patent
Baur

(10) Patent No.: US 9,216,691 B2
(45) Date of Patent: Dec. 22, 2015

(54) EXTERIOR MIRROR WITH SPOTTER MIRROR

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 84 days.

(21) Appl. No.: 14/187,566

(22) Filed: Feb. 24, 2014

(65) Prior Publication Data

US 2014/0240811 A1 Aug. 28, 2014

Related U.S. Application Data

(60) Provisional application No. 61/768,886, filed on Feb. 25, 2013.

(51) Int. Cl.

| | |
|---|---|
| *G02F 1/15* | (2006.01) |
| *G02B 5/10* | (2006.01) |
| *B60R 1/08* | (2006.01) |
| *B60R 1/02* | (2006.01) |
| *B60R 1/06* | (2006.01) |
| *G02F 1/153* | (2006.01) |
| *G02F 1/157* | (2006.01) |
| *B60R 1/12* | (2006.01) |

(Continued)

(52) U.S. Cl.
CPC . *B60R 1/082* (2013.01); *B60R 1/02* (2013.01); *B60R 1/06* (2013.01); *B60R 1/08* (2013.01); *B60R 1/088* (2013.01); *G02F 1/157* (2013.01); *G02F 1/1533* (2013.01); *B32B 17/10174* (2013.01); *B60R 1/025* (2013.01); *B60R 2001/1223* (2013.01); *G02F 1/15* (2013.01); *G02F 1/161* (2013.01)

(58) Field of Classification Search
CPC ............ B60R 1/02; B60R 1/025; B60R 1/08; B60R 1/081; B60R 1/082; B60R 1/088; B60R 2001/1223; G02F 1/15; G02F 1/1533; G02F 1/157; G02F 1/161; G02F 2001/1536; G02F 2001/1552; B32B 17/10174
USPC ......... 359/263, 265, 267, 273, 512, 854, 864, 359/866, 868, 872; 362/294, 300, 373, 459, 362/494, 800; 340/425.5, 903
See application file for complete search history.

(56) References Cited

U.S. PATENT DOCUMENTS

| | | |
|---|---|---|
| 1,114,559 A | 10/1914 | Weed |
| 1,401,942 A | 12/1921 | Benzer |
| 1,672,559 A | 6/1928 | Doble |

(Continued)

*Primary Examiner* — Loha Ben
(74) *Attorney, Agent, or Firm* — Gardner, Linn, Burkhart & Flory, LLP

(57) ABSTRACT

A rearview mirror reflective element assembly for an exterior mirror assembly of a vehicle includes a mirror reflective element having a principal mirror and an auxiliary wide angle spotter mirror. A curved recess is established at a spotter portion of a rear surface of a glass substrate of the mirror reflective element. A spotter mirror reflector coating is established at at least a portion of the curved recess to establish the auxiliary wide angle spotter mirror. A principal mirror reflector coating is established at a surface of the mirror reflective element to establish the principal mirror. A portion of the curved recess is substantially not coated with the spotter mirror reflector coating or a portion of the spotter mirror reflector coating is at least partially hidden from view of a person viewing the front of the mirror reflective element by a coating of the mirror reflective element.

20 Claims, 16 Drawing Sheets

(51) Int. Cl.
*G02F 1/161* (2006.01)
*B32B 17/10* (2006.01)

(56) References Cited

U.S. PATENT DOCUMENTS

| | | | |
|---|---|---|---|
| RE17,274 E | 4/1929 | Porter |
| 1,771,061 A | 7/1930 | Rice |
| 2,135,262 A | 11/1938 | Schumacher |
| 2,263,382 A | 11/1941 | Gotzinger |
| 2,514,989 A | 7/1950 | Buren |
| 2,580,014 A | 12/1951 | Gazda |
| 2,636,419 A | 4/1953 | Kerr |
| 2,763,187 A | 9/1956 | Wiener |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maruyama et al. |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,909,117 A | 9/1975 | Takahashi et al. |
| 3,972,601 A | 8/1976 | Johnson |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,824,231 A | 4/1989 | Quintana |
| 4,826,289 A | 5/1989 | Vandenbrink et al. |
| 4,828,379 A | 5/1989 | Parsons et al. |
| 4,834,521 A | 5/1989 | Dubs |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Majsumiya |
| 4,906,085 A | 3/1990 | Sugihara et al. |
| 4,913,542 A | 4/1990 | Adolfsson |
| 4,917,485 A | 4/1990 | Baldwin, Sr. |
| 4,929,074 A | 5/1990 | Urban |
| 4,932,769 A | 6/1990 | Goosen |
| 4,932,770 A | 6/1990 | Caravaty |
| 4,948,242 A | 8/1990 | Desmond et al. |
| 4,989,964 A | 2/1991 | Meise |
| 5,005,962 A | 4/1991 | Edelman |
| 5,014,167 A | 5/1991 | Roberts |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,371,659 A | 12/1994 | Pastrick et al. |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,437,931 A | 8/1995 | Tsai et al. |
| 5,446,576 A | 8/1995 | Lynam et al. |
| 5,448,397 A | 9/1995 | Tonar |
| 5,479,297 A | 12/1995 | Summers |
| 5,481,409 A | 1/1996 | Roberts |

(56) References Cited

U.S. PATENT DOCUMENTS

| | | |
|---|---|---|
| 5,497,305 A | 3/1996 | Pastrick et al. |
| 5,497,306 A | 3/1996 | Pastrick |
| 5,509,606 A | 4/1996 | Breithaupt et al. |
| 5,517,003 A | 5/1996 | Kadooka et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,621,569 A | 4/1997 | Schlenke |
| 5,621,577 A | 4/1997 | Lang et al. |
| 5,644,442 A | 7/1997 | Lemere |
| 5,649,756 A | 7/1997 | Adams et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,689,370 A | 11/1997 | Tonar et al. |
| 5,691,855 A | 11/1997 | Lupkas |
| 5,715,093 A | 2/1998 | Schierbeek et al. |
| 5,722,836 A | 3/1998 | Younker |
| 5,724,187 A | 3/1998 | Varaprasad et al. |
| 5,751,489 A | 5/1998 | Caskey et al. |
| 5,760,962 A | 6/1998 | Schofield et al. |
| 5,784,211 A | 7/1998 | Mingledorff |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,094 A | 8/1998 | Schofield et al. |
| 5,796,532 A | 8/1998 | Kanazawa |
| 5,803,579 A | 9/1998 | Turnbull et al. |
| 5,805,367 A | 9/1998 | Kanazawa |
| 5,808,777 A | 9/1998 | Lynam et al. |
| 5,823,654 A | 10/1998 | Pastrick et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,863,116 A | 1/1999 | Pastrick et al. |
| 5,864,434 A | 1/1999 | Taylor |
| 5,877,897 A | 3/1999 | Schofield et al. |
| 5,910,854 A | 6/1999 | Varaprasad et al. |
| 5,922,176 A | 7/1999 | Caskey |
| 5,923,457 A | 7/1999 | Byker et al. |
| 5,929,786 A | 7/1999 | Schofield et al. |
| 5,938,320 A | 8/1999 | Crandall |
| 5,980,050 A | 11/1999 | McCord |
| 6,001,486 A | 12/1999 | Varaprasad et al. |
| 6,002,511 A | 12/1999 | Varaprasad et al. |
| 6,005,724 A | 12/1999 | Todd |
| 6,007,207 A | 12/1999 | Liu |
| 6,030,084 A | 2/2000 | Schmidt |
| 6,032,323 A | 3/2000 | Smith et al. |
| 6,033,078 A | 3/2000 | Su et al. |
| 6,065,840 A | 5/2000 | Caskey et al. |
| 6,074,068 A | 6/2000 | Palathingal |
| 6,076,934 A | 6/2000 | Gerdes |
| 6,097,023 A | 8/2000 | Schofield et al. |
| 6,102,546 A | 8/2000 | Carter |
| 6,109,586 A | 8/2000 | Hock |
| 6,111,684 A | 8/2000 | Forgette et al. |
| 6,116,743 A | 9/2000 | Hoek |
| 6,124,647 A | 9/2000 | Marcus et al. |
| 6,132,072 A | 10/2000 | Turnbull et al. |
| 6,154,306 A | 11/2000 | Varaprasad et al. |
| 6,164,564 A | 12/2000 | Franco et al. |
| 6,170,956 B1 | 1/2001 | Rumsey et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,201,642 B1 | 3/2001 | Bos |
| 6,207,083 B1 | 3/2001 | Varaprasad et al. |
| 6,227,689 B1 | 5/2001 | Miller |
| 6,229,435 B1 | 5/2001 | Knapp et al. |
| 6,239,898 B1 | 5/2001 | Byker et al. |
| 6,244,716 B1 | 6/2001 | Steenwyk et al. |
| 6,245,262 B1 | 6/2001 | Varaprasad et al. |
| 6,250,148 B1 | 6/2001 | Lynam |
| 6,257,746 B1 | 7/2001 | Todd et al. |
| 6,260,608 B1 | 7/2001 | Kim |
| 6,270,225 B1 | 8/2001 | Goolsby |
| 6,276,821 B1 | 8/2001 | Pastrick et al. |
| 6,286,965 B1 | 9/2001 | Caskey et al. |
| 6,294,989 B1 | 9/2001 | Schofield et al. |
| 6,310,611 B1 | 10/2001 | Caldwell |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,335,548 B1 | 1/2002 | Roberts et al. |
| 6,341,523 B2 | 1/2002 | Lynam |
| 6,343,402 B1 | 2/2002 | Smith et al. |
| 6,356,376 B1 | 3/2002 | Tonar et al. |
| 6,359,274 B1 | 3/2002 | Nixon et al. |
| 6,379,013 B1 | 4/2002 | Bechtel et al. |
| 6,390,632 B1 | 5/2002 | Palathingal |
| 6,396,397 B1 | 5/2002 | Bos et al. |
| 6,398,377 B1 | 6/2002 | Chou |
| 6,402,328 B1 | 6/2002 | Bechtel et al. |
| 6,420,036 B1 | 7/2002 | Varaprasad et al. |
| 6,420,684 B2 | 7/2002 | Higgins |
| 6,426,485 B1 | 7/2002 | Bulgajewski et al. |
| 6,428,172 B1 | 8/2002 | Hutzel et al. |
| 6,441,943 B1 | 8/2002 | Roberts et al. |
| 6,441,964 B1 | 8/2002 | Chu et al. |
| 6,445,287 B1 | 9/2002 | Schofield et al. |
| 6,449,082 B1 | 9/2002 | Agrawal et al. |
| 6,471,362 B1 | 10/2002 | Carter et al. |
| 6,472,979 B2 | 10/2002 | Schofield et al. |
| 6,498,620 B2 | 12/2002 | Schofield et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B2 | 2/2003 | Lynam |
| 6,523,965 B1 | 2/2003 | Luger |
| 6,523,976 B1 | 2/2003 | Turnbull et al. |
| 6,537,138 B2 | 3/2003 | Ohmori et al. |
| 6,582,109 B2 | 6/2003 | Miller |
| 6,595,649 B2 | 7/2003 | Hoekstra et al. |
| 6,615,438 B1 | 9/2003 | Franco |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,731,205 B2 | 5/2004 | Schofield et al. |
| 6,737,629 B2 | 5/2004 | Nixon et al. |
| 6,742,904 B2 | 6/2004 | Bechtel et al. |

(56) References Cited

U.S. PATENT DOCUMENTS

| | | |
|---|---|---|
| 6,757,109 B2 | 6/2004 | Bos |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 6,882,287 B2 | 4/2005 | Schofield |
| 6,919,796 B2 | 7/2005 | Boddy et al. |
| 6,932,483 B2 | 8/2005 | Strumolo et al. |
| 6,979,090 B1 | 12/2005 | Wnuk |
| 7,001,032 B2 | 2/2006 | Lo |
| 7,005,974 B2 | 2/2006 | McMahon et al. |
| 7,025,469 B1 | 4/2006 | Manfre' et al. |
| 7,038,577 B2 | 5/2006 | Pawlicki et al. |
| 7,080,913 B2 | 7/2006 | Henion et al. |
| 7,097,312 B2 * | 8/2006 | Platzer, Jr. ............... 359/864 |
| 7,106,392 B2 | 9/2006 | You |
| 7,126,456 B2 | 10/2006 | Boddy et al. |
| 7,156,532 B2 | 1/2007 | Stonecypher |
| 7,167,294 B2 | 1/2007 | Lynam et al. |
| 7,168,830 B2 | 1/2007 | Pastrick et al. |
| 7,184,190 B2 | 2/2007 | McCabe et al. |
| 7,195,381 B2 | 3/2007 | Lynam et al. |
| 7,202,445 B2 | 4/2007 | Yamada |
| 7,230,207 B2 | 6/2007 | Witzke et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,306,355 B2 | 12/2007 | Walser et al. |
| 7,324,261 B2 | 1/2008 | Tonar et al. |
| 7,338,177 B2 | 3/2008 | Lynam |
| 7,339,149 B1 | 3/2008 | Schofield et al. |
| 7,342,707 B2 | 3/2008 | Roberts et al. |
| 7,345,680 B2 | 3/2008 | David |
| 7,349,143 B2 | 3/2008 | Tonar et al. |
| 7,370,983 B2 | 5/2008 | DeWind et al. |
| 7,377,675 B2 | 5/2008 | Pastrick et al. |
| 7,391,563 B2 | 6/2008 | McCabe et al. |
| 7,400,435 B2 | 7/2008 | Byers et al. |
| 7,420,756 B2 | 9/2008 | Lynam |
| 7,423,522 B2 | 9/2008 | O'Brien et al. |
| 7,448,764 B2 | 11/2008 | Platzer, Jr. |
| 7,492,281 B2 | 2/2009 | Lynam et al. |
| 7,517,099 B2 | 4/2009 | Hannah |
| 7,526,103 B2 | 4/2009 | Schofield et al. |
| 7,581,859 B2 | 9/2009 | Lynam |
| 7,626,749 B2 * | 12/2009 | Baur et al. ............... 359/265 |
| 7,636,188 B2 | 12/2009 | Baur et al. |
| 7,748,856 B2 * | 7/2010 | Zhao ............... 359/868 |
| 7,857,469 B2 | 12/2010 | Sinelli et al. |
| 7,864,400 B1 | 1/2011 | Cammenga et al. |
| D633,019 S | 2/2011 | De Wind |
| D633,423 S | 3/2011 | De Wind |
| D638,761 S | 5/2011 | De Wind |
| 7,967,458 B2 | 6/2011 | Karpus et al. |
| 8,021,005 B2 * | 9/2011 | Zhao ............... 359/868 |
| D647,017 S | 10/2011 | De Wind |
| D660,208 S | 5/2012 | De Wind |
| D661,234 S | 6/2012 | De Wind |
| 8,508,831 B2 | 8/2013 | De Wind et al. |
| 8,730,553 B2 | 5/2014 | De Wind et al. |
| 8,736,940 B2 * | 5/2014 | Rawlings ............... 359/267 |
| 8,917,437 B2 | 12/2014 | Baur et al. |
| 8,922,867 B2 | 12/2014 | De Wind et al. |
| 8,976,439 B2 | 3/2015 | De Wind et al. |
| 2002/0036828 A1 | 3/2002 | Wong |
| 2002/0105741 A1 | 8/2002 | Platzer, Jr. |
| 2002/0159169 A1 | 10/2002 | McCord |
| 2002/0159270 A1 | 10/2002 | Lynam et al. |
| 2003/0039039 A1 | 2/2003 | Thomas et al. |
| 2003/0043589 A1 | 3/2003 | Blank |
| 2003/0117731 A1 | 6/2003 | Platzer, Jr. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0114260 A1 | 6/2004 | Bartnick |
| 2004/0165291 A1 | 8/2004 | Platzer, Jr. |
| 2004/0257685 A1 | 12/2004 | Minor et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0232469 A1 | 10/2005 | Schofield et al. |
| 2005/0248859 A1 | 11/2005 | Platzer, Jr. |
| 2006/0050018 A1 | 3/2006 | Hutzel et al. |
| 2006/0061008 A1 | 3/2006 | Karner et al. |
| 2006/0125919 A1 | 6/2006 | Camilleri et al. |
| 2006/0126150 A1 | 6/2006 | Tonar et al. |
| 2006/0171704 A1 | 8/2006 | Bingle et al. |
| 2006/0184297 A1 | 8/2006 | Higgins-Luthman |
| 2006/0268440 A1 | 11/2006 | Platzer, Jr. |
| 2006/0279863 A1 | 12/2006 | Starbuck |
| 2007/0058257 A1 | 3/2007 | Lynam |
| 2007/0285789 A1 | 12/2007 | Lindahl et al. |
| 2008/0212189 A1 | 9/2008 | Baur et al. |
| 2008/0225421 A1 | 9/2008 | Platzer |
| 2009/0040306 A1 | 2/2009 | Foote et al. |
| 2009/0115631 A1 | 5/2009 | Foote et al. |
| 2009/0213481 A1 | 8/2009 | Wilson |
| 2009/0237820 A1 | 9/2009 | McCabe et al. |
| 2010/0039691 A1 | 2/2010 | Thomas et al. |
| 2010/0195228 A1 | 8/2010 | Sinelli et al. |
| 2010/0197203 A1 | 8/2010 | Wilson et al. |
| 2010/0315732 A1 | 12/2010 | Henion et al. |
| 2010/0321757 A1 | 12/2010 | Cammenga et al. |
| 2011/0194185 A1 | 8/2011 | Cammenga et al. |
| 2014/0022390 A1 | 1/2014 | Blank et al. |
| 2014/0254015 A1 * | 9/2014 | Rawlings ............... 359/512 |
| 2014/0293169 A1 | 10/2014 | Uken et al. |
| 2014/0313563 A1 | 10/2014 | Uken et al. |

* cited by examiner

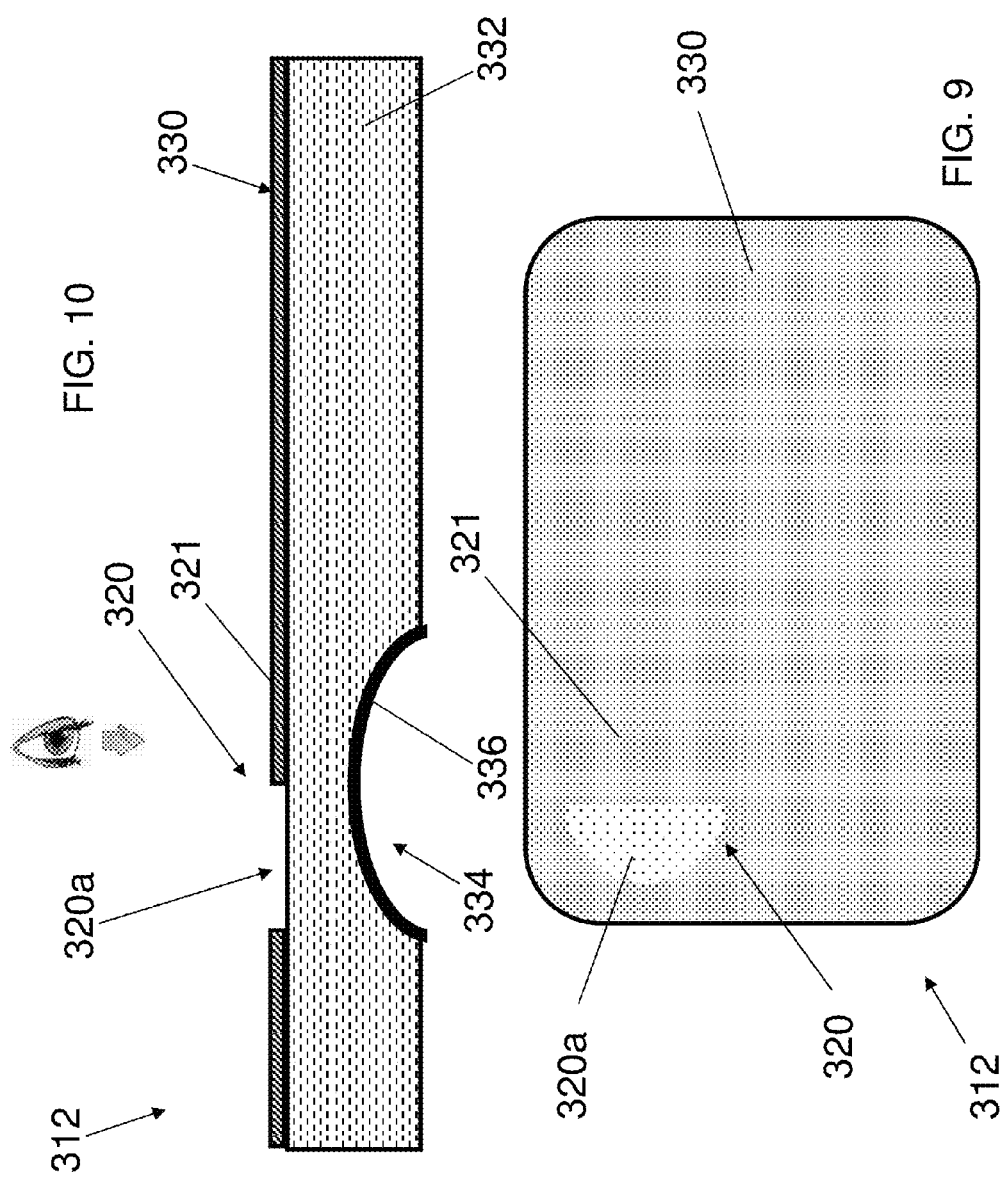

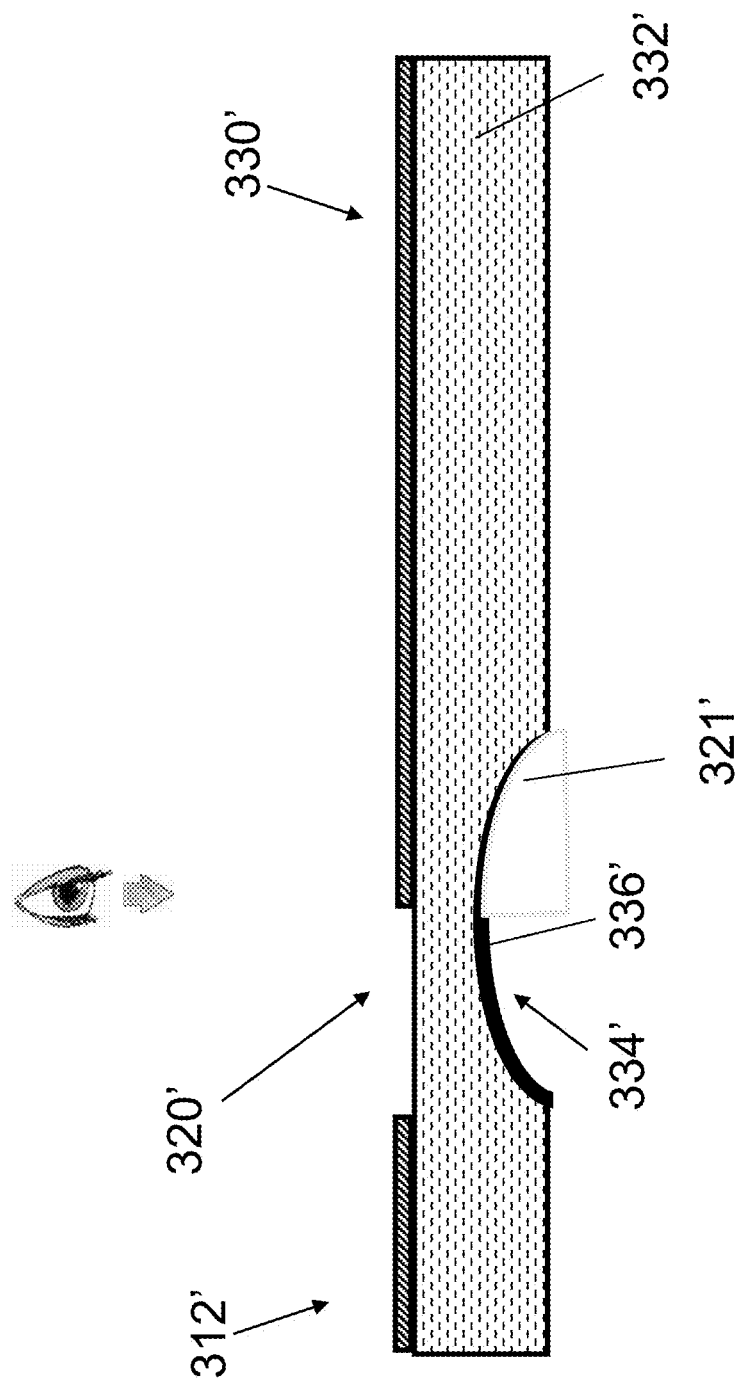

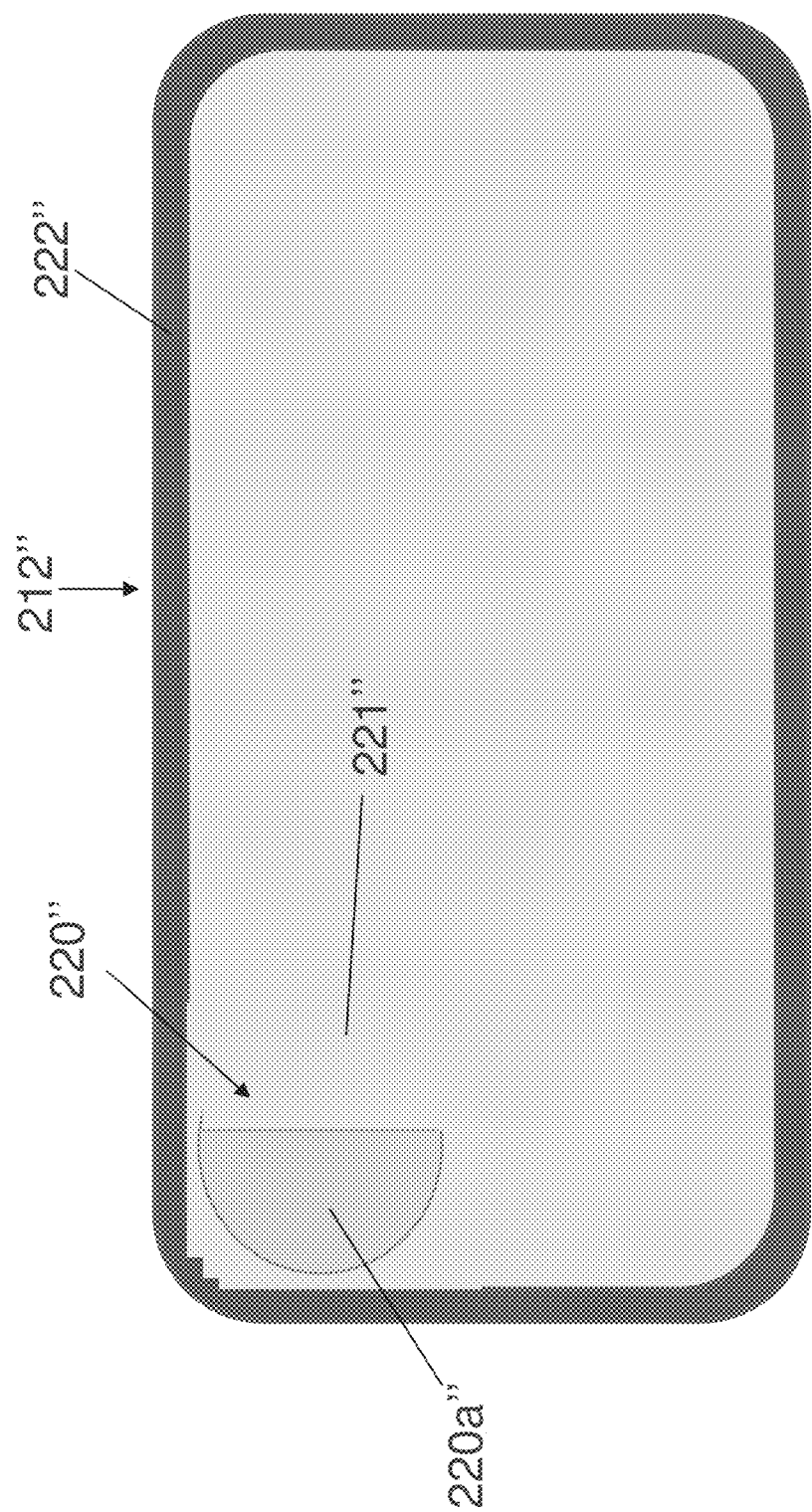

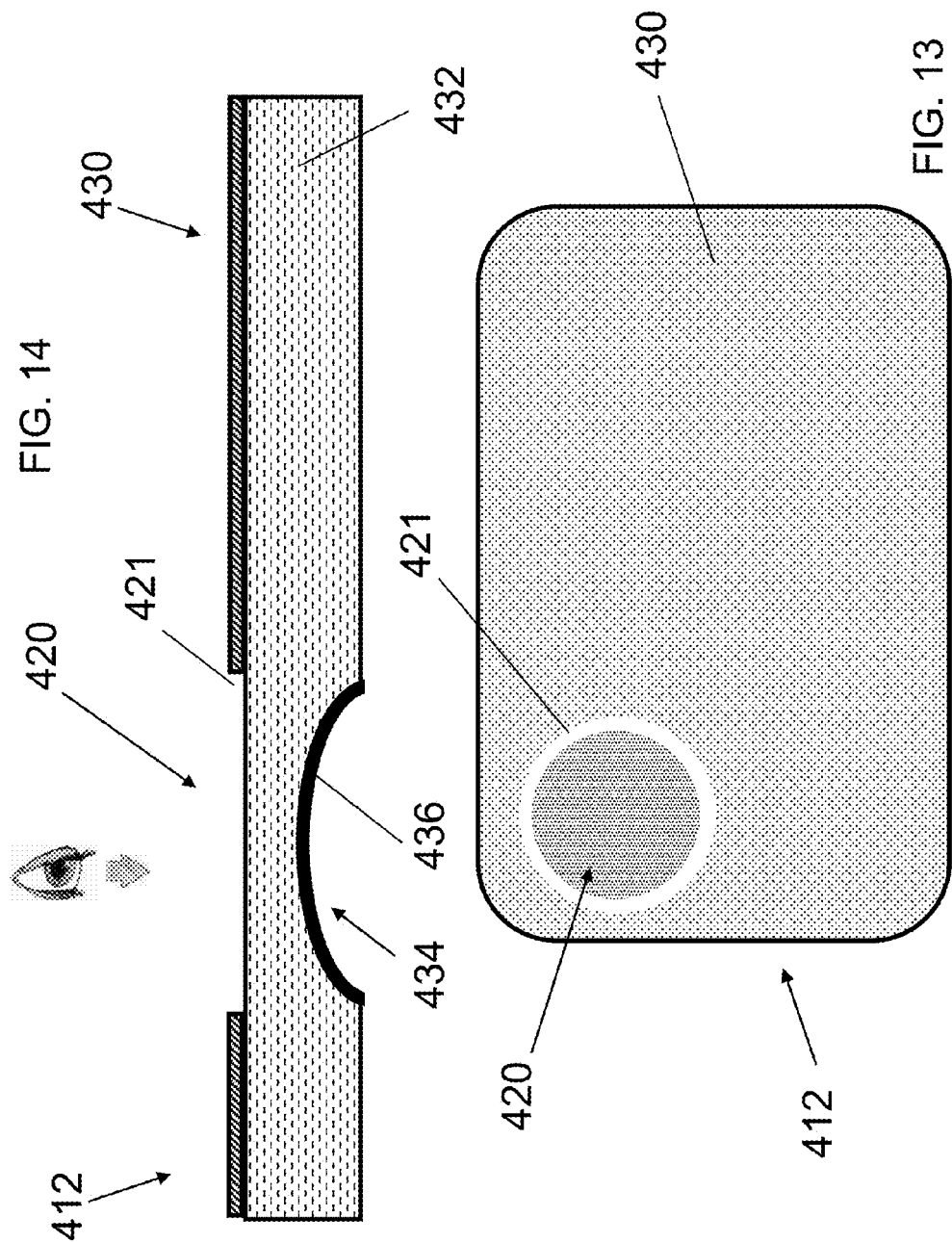

EXTERIOR MIRROR WITH SPOTTER MIRROR

CROSS REFERENCE TO RELATED APPLICATION

The present application claims the filing benefits of U.S. provisional application Ser. No. 61/768,886, filed Feb. 25, 2013, which is hereby incorporated herein by reference in its entirety.

FIELD OF THE INVENTION

The present invention relates generally to reflective element assemblies for rearview mirrors of vehicles and, more particularly, to reflective element assemblies with a wide angle auxiliary mirror reflector or spotter mirror for vehicular exterior rearview mirror assemblies.

BACKGROUND OF THE INVENTION

Reflective element assemblies for exterior rearview mirror assemblies of vehicles may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 5,080,492; 5,050,977; and/or 5,033,835, which are hereby incorporated herein by reference in their entireties, and optionally may have an integrally formed auxiliary mirror reflector, such as the types described in U.S. Pat. Nos. 8,021,005; 7,934,844; 7,887,204; 7,824,045; and 7,748,856, which are hereby incorporated herein by reference in their entireties.

SUMMARY OF THE INVENTION

The present invention provides a mirror reflective element for an exterior rearview mirror assembly. The mirror reflective element comprises a ground in wide angle auxiliary or spotter mirror element and a principal or main mirror element (in North America, typically a flat or planar or plano mirror element). The spotter mirror element is established as a circular ground in or otherwise formed concave surface or recess at the rear surface (or second surface) of the glass substrate used for the mirror reflective element, and is configured to provide a driver-viewable wide angle reflector or spotter mirror element at only a portion of the circular shaped ground in concave surface. For example, a coating may be configured or established at the first surface of the substrate of the mirror reflective element to partially overlap the ground in recess or concave surface to provide the driver-viewable reflector at only a portion of the circular concave recess (that itself is reflector-coated) so as to tailor and/or configure the sideward/rearward field of view of the auxiliary mirror element to provide a targeted or customized field of view at least substantially into a blind spot of the principal or main mirror reflector when used on an equipped vehicle. This first surface coating masks a portion of the reflector-coated circular concave recess from direct view by the driver of the equipped vehicle. Such a masking coating limits or reduces the overlap between the field of view of the principal reflector and limits/reduces/eliminates the field of view of the spotter mirror reflector viewing towards the side of the equipped vehicle. Optionally, a demarcating band or layer or element may be established at least partially around the perimeter or periphery of the spotter mirror element on the immediately adjacent circumscribing or at least partially circumscribing portion of the flat mirror element to demarcate the spotter mirror to enhance the driver's ability to readily discern and distinguish the spotter mirror reflected image from the principal mirror reflected image when driving the equipped vehicle.

These and other objects, advantages, purposes and features of the present invention will become apparent upon review of the following specification in conjunction with the drawings.

BRIEF DESCRIPTION OF THE DRAWINGS

FIG. 9 is a plan view of another reflective element with a spotter mirror of the present invention, with a border layer around the perimeter of the reflective element;

FIG. 10 is a sectional view of the reflective element of FIG. 9;

FIG. 11 is a sectional view of another reflective element of the present invention;

FIG. 12 is a plan view of another reflective element and spotter mirror of the present invention, with a border layer around the perimeter of the reflective element and around the spotter mirror;

FIG. 13 is a plan view of another reflective element with a spotter mirror of the present invention, with a border layer around the perimeter of the spotter mirror that is established by removing the reflective coating around the spotter mirror;

FIG. 14 is a sectional view of the reflective element of FIG. 13;

DESCRIPTION OF THE PREFERRED EMBODIMENTS

Figure 1:
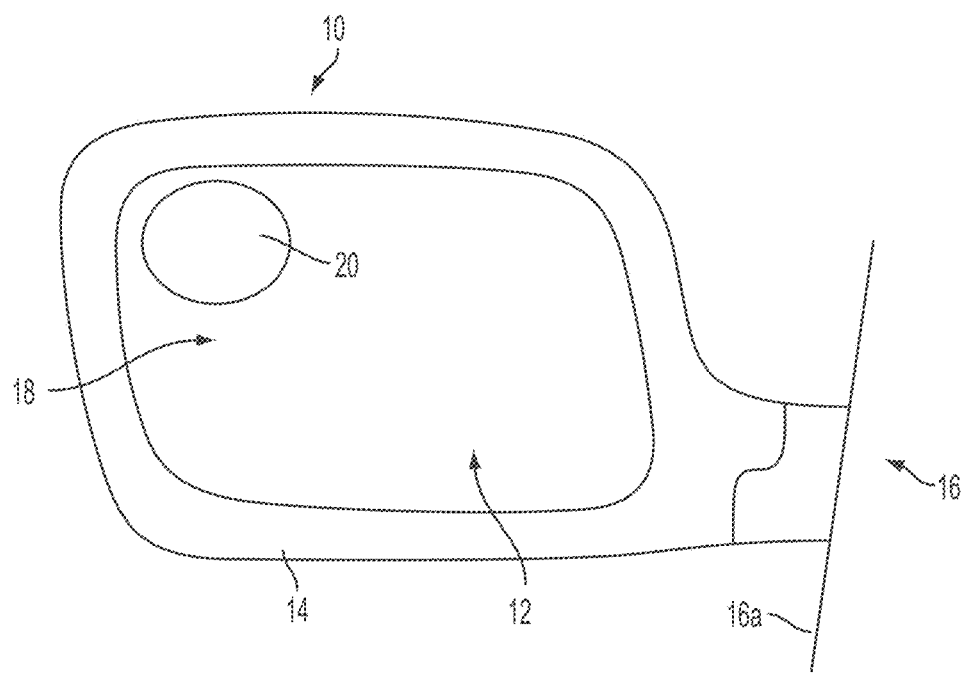
FIG. 1 is a plan view of an exterior rearview mirror assembly with a reflective element assembly in accordance with the present invention.

Referring now to the drawings and the illustrative embodiments depicted therein, an exterior rearview mirror assembly 10 for a vehicle includes a mirror reflective element assembly 12 received in and/or supported by a mirror shell or casing 14 (FIG. 1). Mirror assembly 10 is mounted at the side 16a of a host or subject vehicle 16. Mirror reflective element 12 includes a first or principal mirror reflective element portion 18 and a second or auxiliary wide angle reflective element portion or reflective optic or spotter mirror 20, which may be integrally formed with the mirror reflective element 12, such as by utilizing aspects of the mirror assemblies described in U.S. Pat. Nos. 8,021,005; 7,934,844; 7,887,204; 7,824,045; and 7,748,856, and/or U.S. patent application Ser. No. 13/628,783, filed Sep. 27, 2012, which are hereby incorporated herein by reference in their entireties. The auxiliary wide angle optic may be integrally formed such as by physically removing, such as by grinding or ablation or the like, a portion of the second surface of the front substrate so as to create or establish a physical dish-shaped generally convex-shaped depression or recess or crater at the second surface of the front substrate, and coating the formed depression or recess with a reflector coating or element or the like, such as described in U.S. Pat. No. 8,021,005, incorporated above.

Figure 2:
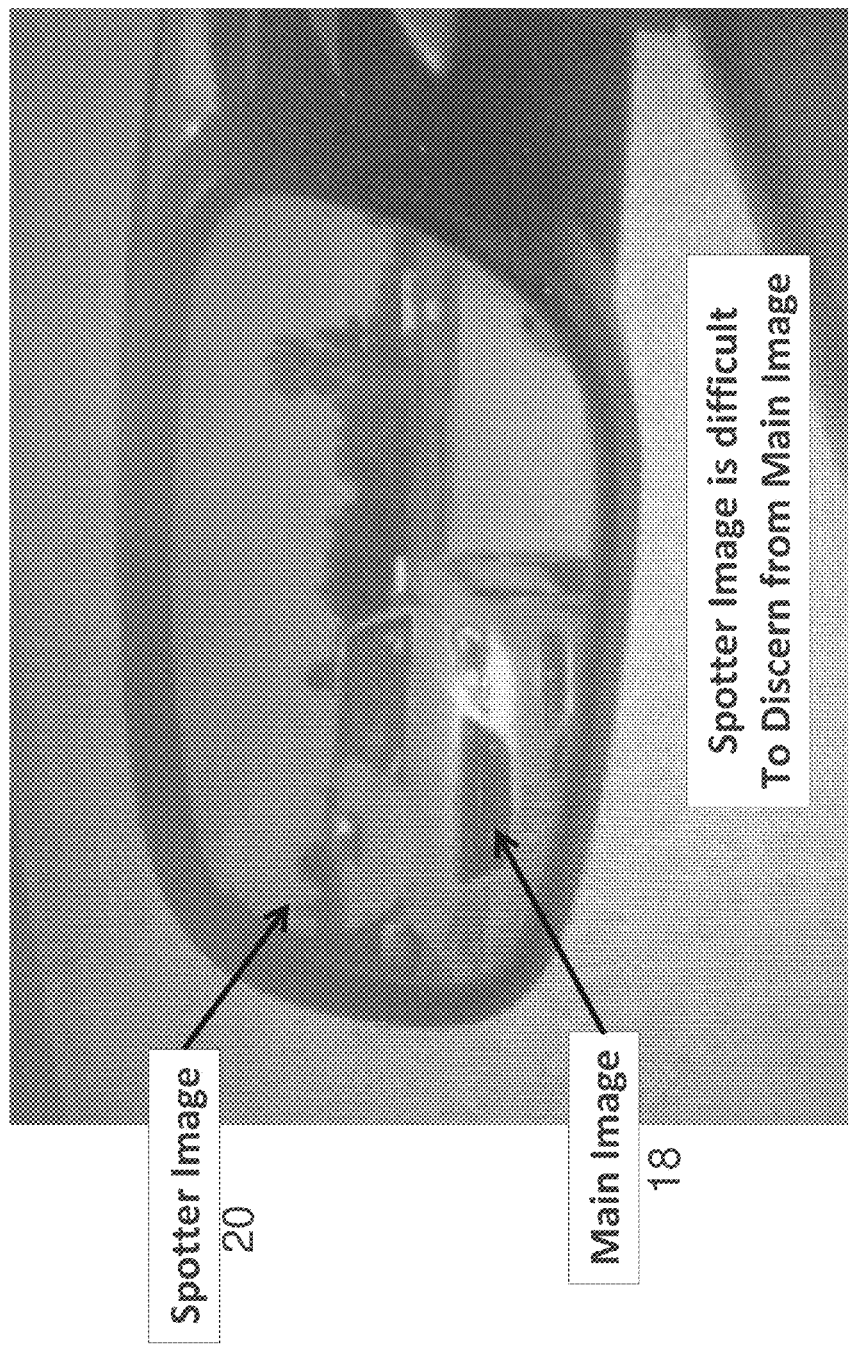
FIG. 2 is an image of a reflection at a known exterior mirror assembly with a spotter mirror.
Figure 3:
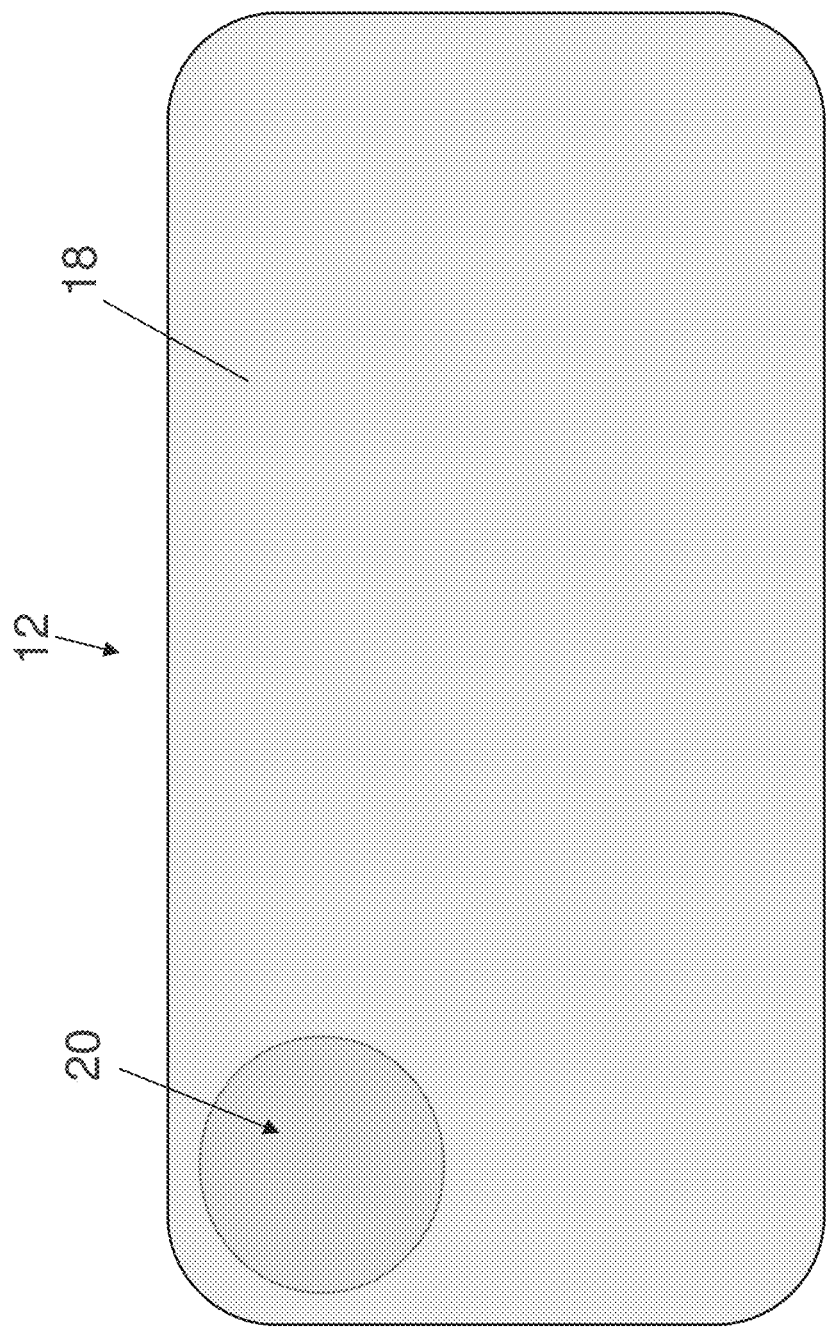
FIG. 3 is a plan view of a reflective element having a spotter mirror of the types shown in FIGS. 1 and 2.

As shown in FIGS. 2 and 3, the spotter mirror 20 is not readily discernible at the reflective element 12 and thus, the spotter image may be difficult to discern from the main reflected image at the main or principal reflector portion 18. Thus, the driver of the vehicle, upon viewing the reflective element at a side of the vehicle (such as at the driver-side of the vehicle as shown in FIG. 2), may not readily discern the spotter mirror image from the main image.

Figure 4:
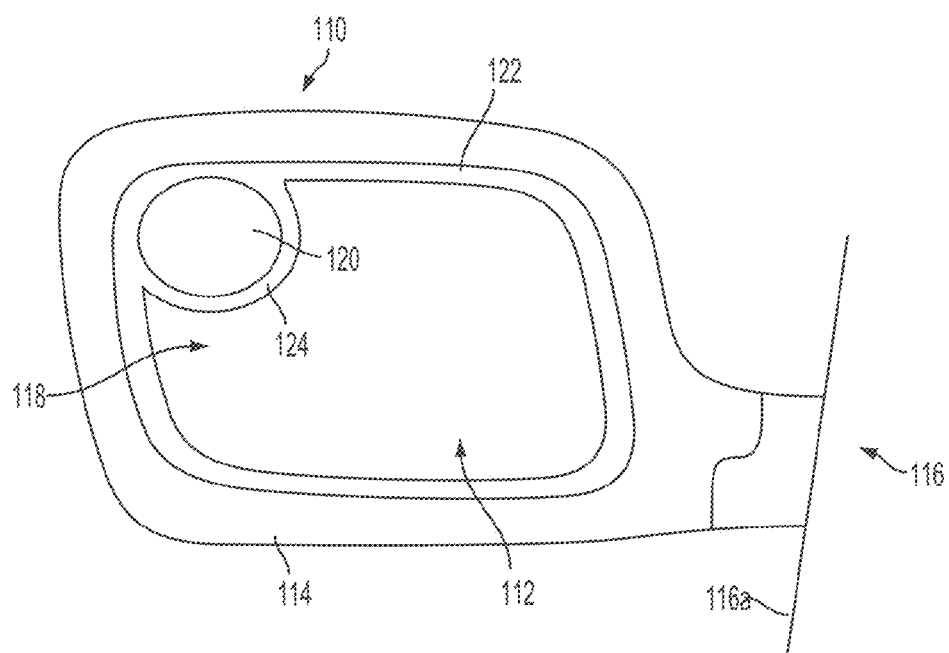
FIG. 4 is a plan view of a reflective element having a spotter mirror and border layer in accordance with the present invention.
Figure 5:
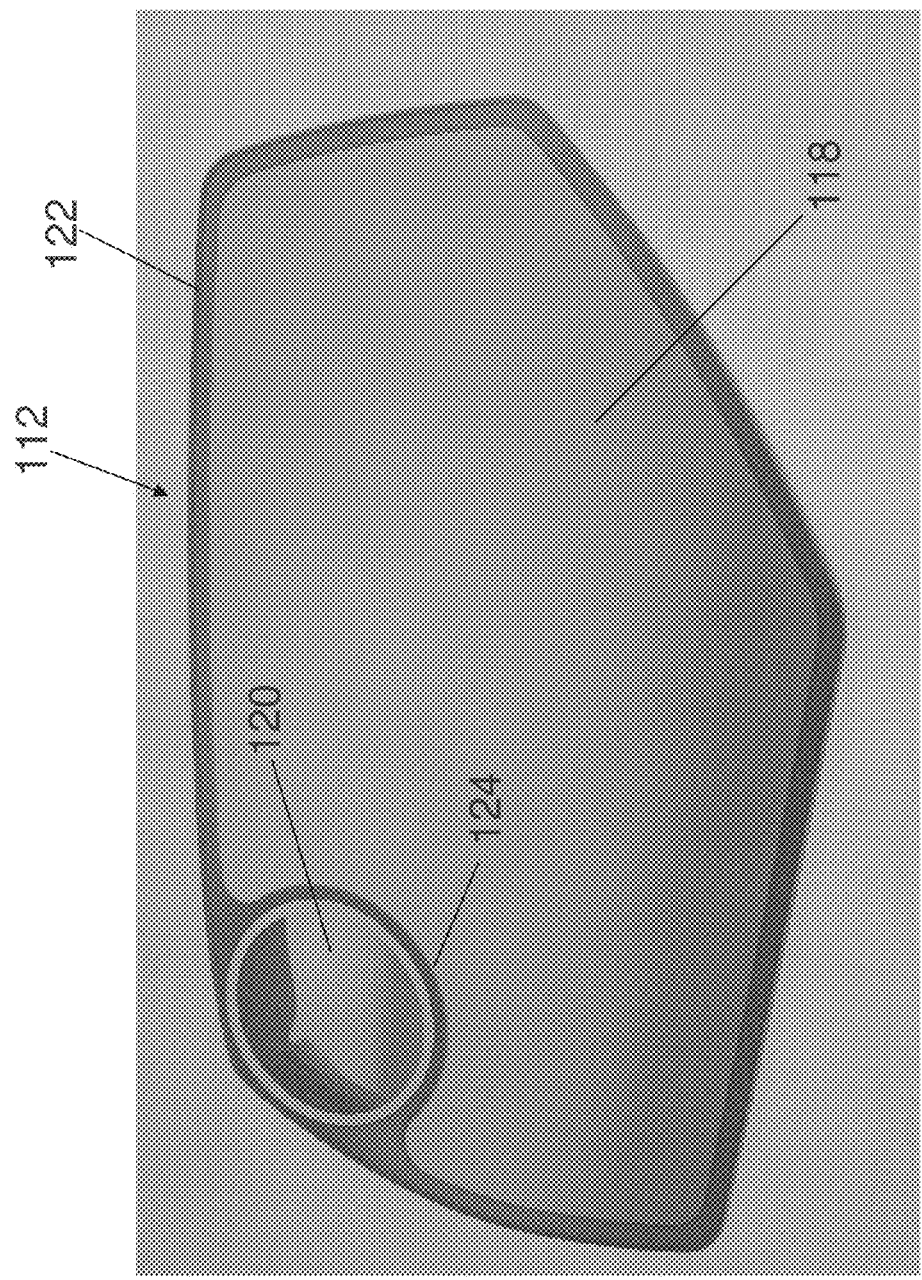
FIG. 5 is a plan view of another reflective element having a spotter mirror and border layer in accordance with the present invention.
Figure 6:
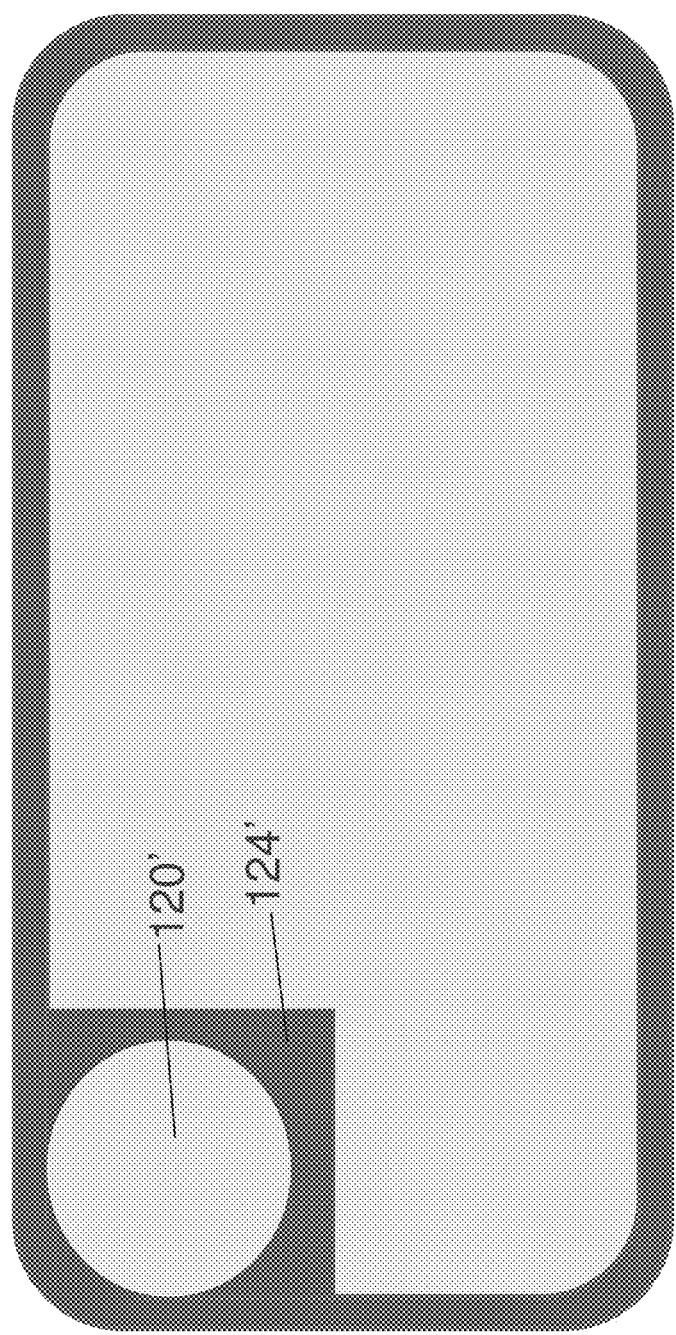
FIG. 6 is a plan view of another reflective element having a spotter mirror and border layer of the present invention.

Referring now to FIGS. 4 and 5, a mirror assembly 110 includes a mirror reflective element assembly 112 received in and/or supported by a mirror shell or casing 114. Mirror assembly 110 is mounted at the side 116a of a host or subject vehicle 116. Mirror reflective element 112 includes a first or principal mirror reflective element portion 118 and a second or auxiliary wide angle reflective element portion or reflective optic or spotter mirror 120, which may be integrally formed with the mirror reflective element 112, such as by utilizing aspects of the mirror assemblies described in U.S. Pat. Nos. 8,021,005; 7,934,844; 7,887,204; 7,824,045; and 7,748,856, and/or U.S. patent application Ser. No. 13/628,783, filed Sep. 27, 2012, which are hereby incorporated herein by reference in their entireties. As shown in FIGS. 4 and 5, the mirror reflective element includes a demarcating layer or band or element 122, 124 that is disposed or established around the perimeter of the reflective element 112 and around the perimeter of the spotter mirror 120 so as to demarcate the spotter mirror 120 from the main reflector portion 118 to enhance the viewability and discernibility of the spotter mirror to the driver of the vehicle 116. The demarcating layer or layers may utilize aspects of the hiding layers described in U.S. patent application Ser. No. 13/628,783, filed Sep. 27, 2012, which is hereby incorporated herein by reference in its entirety. The demarcating layer or contrasting coating or layer or material may comprise any suitable material, and may provide a different color or reflectivity or may comprise a dark or opaque color to demarcate the spotter mirror and enhance discernibility of the spotter mirror from the main mirror (which may comprise a flat mirror, a convex mirror or a free form mirror (such as utilizing aspects of the mirrors described in U.S. patent application Ser. No. 13/942,751, filed Jul. 16, 2013, which is hereby incorporated herein by reference in its entirety. As shown in FIGS. 4 and 5, the demarcating layer or band may comprise a curved band around the periphery of the circular spotter mirror, or, and with reference to FIG. 6, the demarcating layer 124' may comprise any other suitable or appropriate or selected shape, such as a rectangular shape around the circular spotter mirror 120' or the like.

Optionally, the demarcating coating or layer may comprise a metallic perimeter band around the perimeter of the reflective element and around the perimeter of the auxiliary wide angle reflector portion, such as by utilizing aspects of the reflective elements described in U.S. Pat. Nos. 7,626,749; 7,274,501; 7,184,190; and/or 7,255,451, and/or U.S. Publication No. US-2006-0061008, which is hereby incorporated herein by reference in their entireties. For example, the perimeter band portion 122 may be established around the periphery of the rear surface of the glass substrate and a spotter band portion 124 may be established around the periphery of the spotter portion of the reflective element. For example, the perimeter band portion 122 may comprise a band that is about 3-5 mm wide or thereabouts and functions to hide the main or perimeter seal around of the reflective element, while the band portion 124 is established around the spotter portion and may be sized at the discretion of the mirror manufacturer, and may be sized depending on the size of the spotter recess and the size of the principal reflecting area of the mirror reflective element. Optionally, the perimeter band or bands may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,626,749; 7,360,932; 7,289,037; 7,255,451; 7,274,501; and/or 7,184,190, and/or PCT Application No. PCT/US2010/32017, filed Apr. 22, 2010, and/or PCT Application No. PCT/US2010/51741, filed Oct. 7, 2010, and/or U.S. Publication Nos. US-2006-0061008 and/or US-2006-0050018, which are hereby incorporated herein by reference in their entireties.

Figure 7:
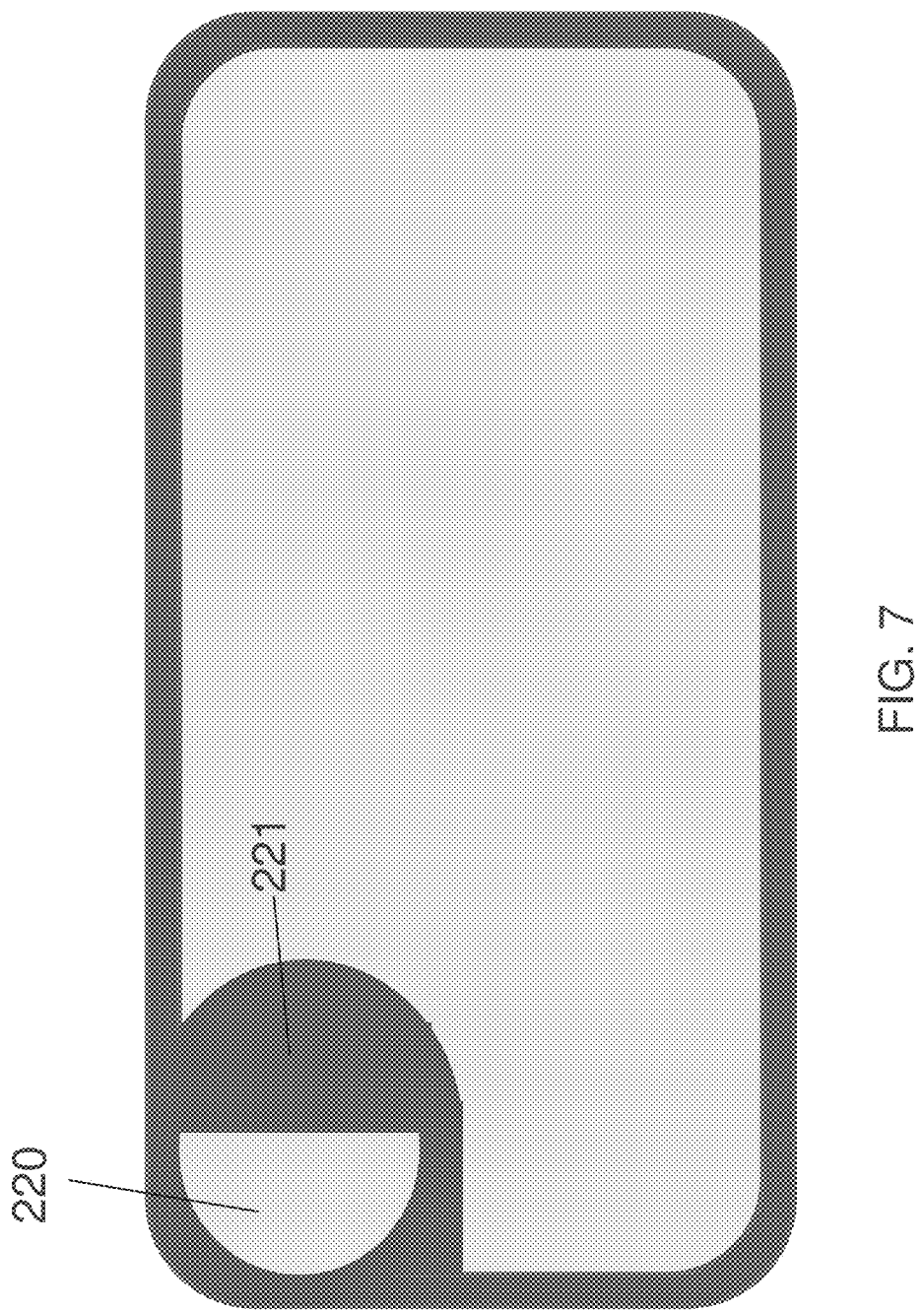
FIG. 7 is a plan view of a reflective element having a partial spotter mirror in accordance with the present invention.

Optionally, the spotter mirror and reflective element of the present invention may be configured to provide the desired field of view of the blind spot area at the side of the vehicle, and with the field of view being tailored or configured to encompass the blind spot region and not other regions (where the other regions may already be encompassed by the field of view of the main mirror reflective element portion. The spotter mirror or ground in portion of the spotter mirror may be selectively coated with a reflective coating or layer or material to provide a specified or selected or directed field of view. For example, and with reference to FIG. 7, a contrasting or dark or opaque or low reflective or non-reflective area 221 may be established over a portion of the spotter mirror 220, so that only a portion (such as about half or a little over half or a little less than half) of the spotter mirror 220 is used to provide the spotter function, and the other portion of the spotter mirror is blocked or hidden by the contrasting area or coating or layer 221. For example, a portion of the spotter mirror reflector corresponding to more than half of the spotter mirror area or region may be viewable and usable as a spotter mirror while another portion of the spotter mirror reflector corresponding to less than half of the spotter mirror area or region may be blocked or otherwise non-viewable or usable as a spotter mirror.

Figure 8:
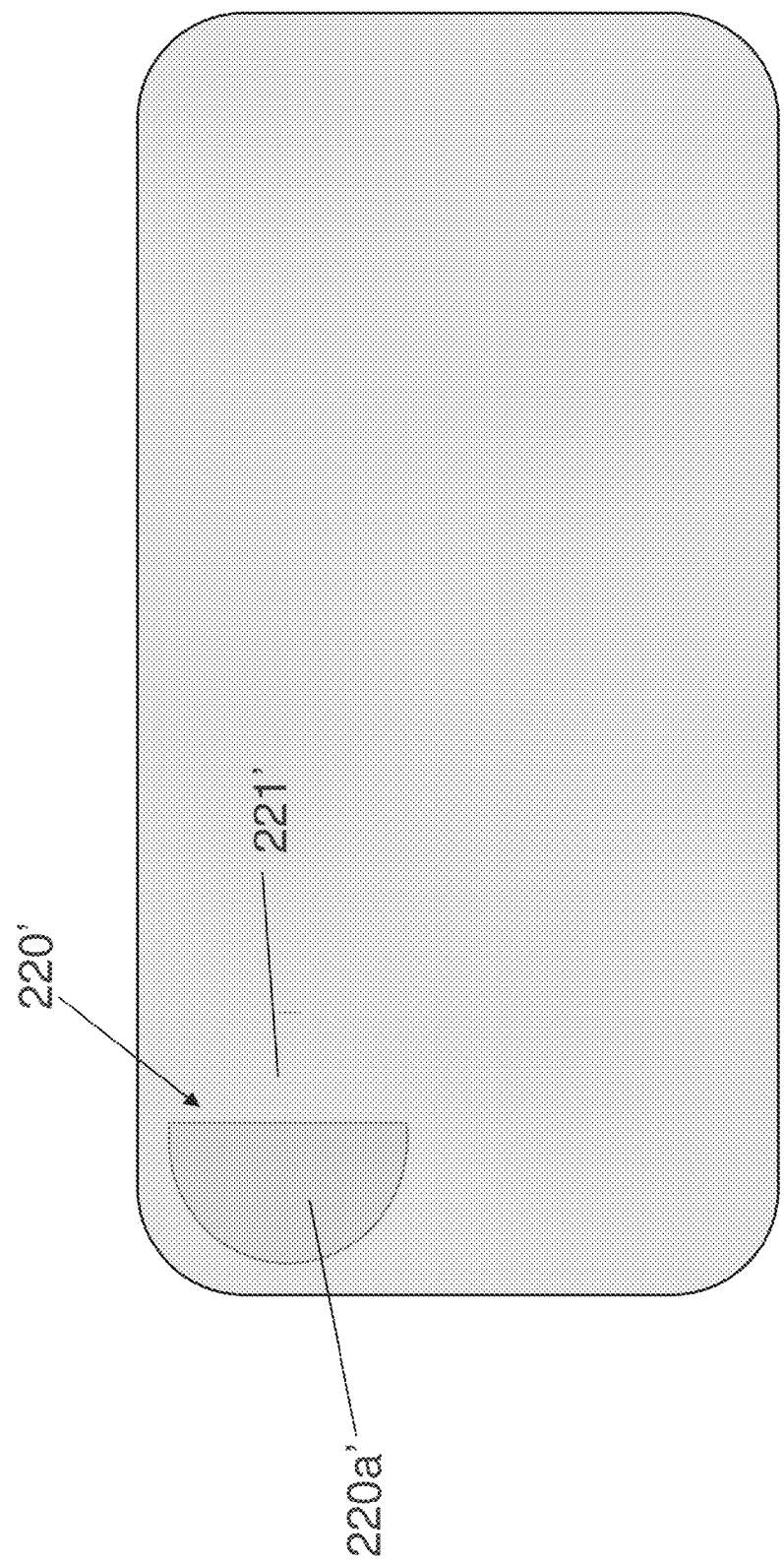
FIG. 8 is a plan view of another reflective element with a spotter mirror of the present invention, with a border layer around the perimeter of the reflective element.

Optionally, and such as can be seen with reference to FIG. 8, the main mirror reflector may be established over the portion or area 221' of the ground in or recessed spotter mirror area 220', so that only a portion 220a' (such as about half or a little over half or a little less than half) of the spotter mirror 220' is used to provide the spotter function, and the other portion of the ground in circular spotter mirror is covered by the main mirror reflector (such as by establishing a main or principal mirror reflector over the first surface of the glass substrate and having only a semi-circular area not coated so that the portion of the ground in circular spotter mirror is disposed behind the uncoated area to provide a semi-circular spotter mirror.

As can be seen with reference to FIGS. 9 and 10, the main mirror reflector 330 of the fixed reflectance, single glass substrate mirror reflective element 312 may be established at the first or front surface of the glass substrate 332 with the curved circular recess 334 ground or otherwise established at the second or rear surface of the glass substrate. A mirror reflector 336 is established at the curved surface of the circular recess 334. As shown in FIGS. 9 and 10, with a portion 321 of the main or principal mirror reflector 330 overlapping a portion of the circular recess 334, only a portion 320*a* of the spotter mirror element 320 is viewable through the glass substrate to a person viewing the mirror reflective element, while the principal mirror reflector 330 is viewable at the overlapping portion 321.

Figure 18:
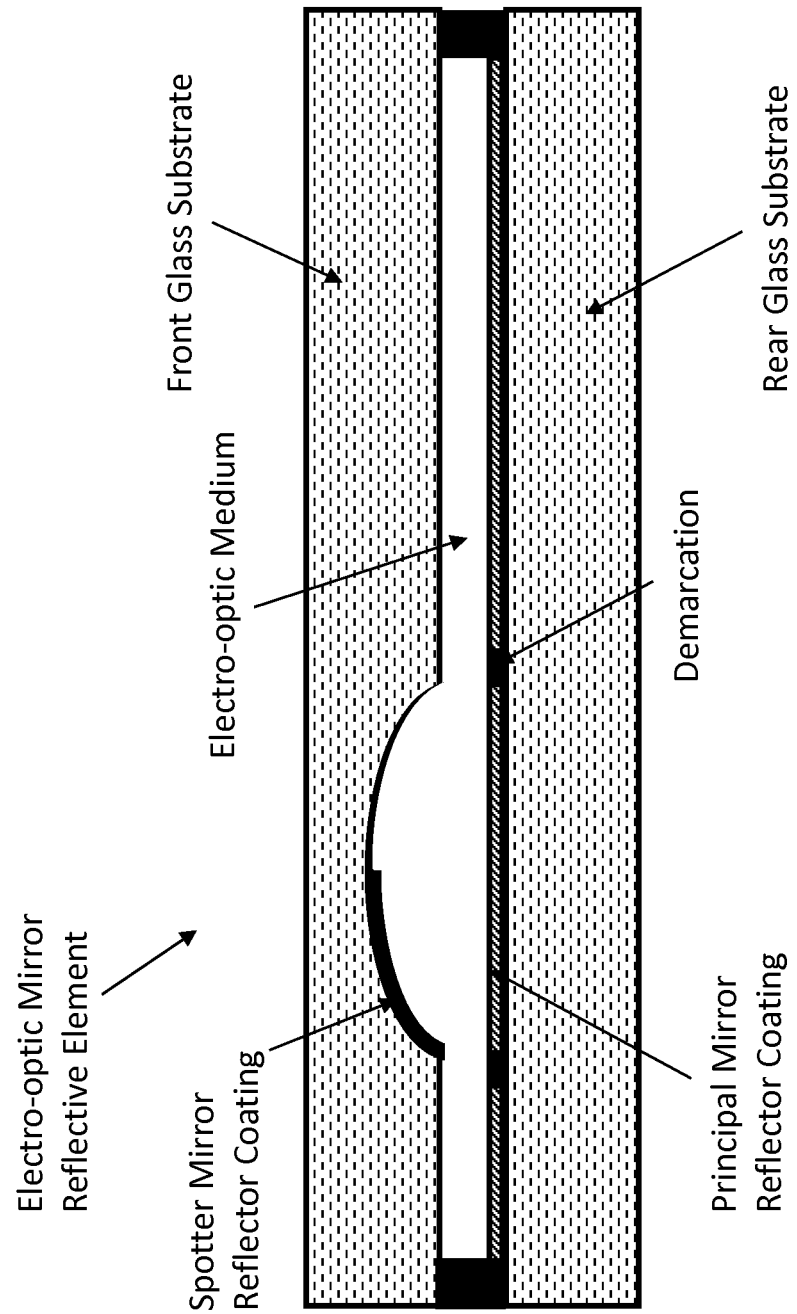
FIG. 18 is a sectional view of an electro-optic mirror reflective element of the present invention.

Optionally, the spotter mirror reflector may be established at only a portion of the circular recess. For example, and as shown in FIG. 11, the spotter mirror reflector 336' may be established over about half (or more than half or less than half) of the curved recess 334' (such as at an outboard half so that the inboard half or portion 321' is not coated), and the principal mirror reflector coating 330' may be established over the front surface of the glass substrate 332' of the reflective element 312' so that the spotter mirror 320' is established at a portion of the curved recess that is devoid of the front surface principal mirror reflector coating. Optionally, and such as shown in FIG. 18, for a variable reflectance electro-optic mirror reflective element (having a front glass substrate with the circular recess established at its rear surface and a rear glass substrate and an electro-optic medium established therebetween), the spotter mirror reflector may be established at an outboard portion or half of the circular recess and not established at the inboard portion or half of the circular recess, whereby the third surface mirror reflector (established at the front or third surface of the rear glass substrate) may be viewable through the principal reflecting portion or element and through the portion of the circular recess that is not reflector-coated, so as to provide a variable reflectance mirror reflective element with a partial spotter mirror element that is similar in appearance as the mirror reflective element of FIG. 9.

Optionally, although shown as having a semi-circle spotter mirror element, other shapes may be provided. Also, although shown as having the semi-circular spotter mirror element with its diameter portion being generally vertically oriented, the exposed or viewable spotter mirror element may have a semi-circular shape with its widest diameter portion being angled with respect to vertical, depending on the particular application of the mirror reflective element. Optionally, the spotter mirror element may be ground in at the rear of the glass substrate in a spherical or partial spherical shape or may be angled or otherwise formed to provide the desired or appropriate shape, depending on the particular application of the mirror reflective element.

Optionally, and as shown in FIG. 12, the mirror reflective element 212" may include a dark perimeter band 222" around the main or principal reflecting region 218" and may or may not provide the demarcating feature at or around or partially around the semi-circular spotter mirror 220" (which, in the illustrated embodiment, has a portion hidden by an overcoating layer or the like 221" so that only a portion 220*a*" is used to provide the spotter function). Examples of materials and/or techniques for establishing such perimeter coatings or layers or elements and/or demarcating coatings or layers or elements can be found in U.S. Pat. Nos. 5,066,112 and/or 5,724,187, which are hereby incorporated herein by reference in their entireties.

Optionally, and with reference to FIGS. 13 and 14, a main mirror reflector 430 of the fixed reflectance, single glass substrate mirror reflective element 412 may be established at the first or front surface of the glass substrate 432 with the curved circular recess 434 ground or otherwise established at the second or rear surface of the glass substrate. A mirror reflector 436 is established at the curved surface of the circular recess 434. As shown in FIGS. 13 and 14, with the main or principal mirror reflector 430 removed at the spotter mirror region 420 and around the spotter mirror region, a demarcation region 421 or outline is provided around the spotter mirror region 420 by a transparent region of the reflective element that is devoid of the principal reflector coating and that is devoid of the spotter mirror reflector coating 436.

Optionally, the principal mirror reflector 430 may be partially established at an area that corresponds to or is over the curved recess to provide a partial or semi-circular spotter mirror (such as descried above) or the spotter mirror reflector may be established at only a portion of the circular recess to provide a partial or semi-circular spotter mirror. Optionally, the demarcation around the spotter mirror may be provided by a different coating (such as an opaque or colored or at least partially opaque coating at the front or rear surface of the glass substrate) to provide the desired appearance of the reflective element and spotter mirror and demarcation.

Although shown in FIGS. 13 and 14 as a single substrate reflective element, the demarcation may be provided for a variable reflectance electro-optic mirror reflective element (such as a reflective element having a front glass substrate with the circular recess established at its rear surface and a rear glass substrate and an electro-optic medium established therebetween). In such an application, the mirror reflector coating may be removed around the spotter region (such as via masking the third or fourth surface (the front or rear surface of the rear substrate) during coating of the principal reflector or via laser ablation or the like of a third or fourth surface reflector coating) to provide the demarcation or outline of the spotter mirror. Optionally, the third or fourth surface of the rear substrate (or the second or rear surface of the front substrate) may be coated with another coating (such as an opaque or colored or at least partially opaque coating at the front or rear surface of the rear glass substrate) to provide the desired demarcation or outline of the spotter mirror.

Thus, the omission of any coating (and thus the transparency of the reflective element where no coating is disposed) provides a means for demarcating the spotter mirror region. Also, for double substrate embodiments (such as variable transmission or electro-optic or electrochromic reflective elements), omission of coatings at the second or rear surface of the front substrate (around the spotter mirror) may allow for coatings or demarcation layers being established at the third or fourth surface of the rear substrate, and/or omission of coatings at the third surface reflector (such as omission of a portion of the reflector coating established at the third or front surface of the rear substrate) around the spotter mirror may allow for coatings or demarcation layers to be established at the fourth or rear surface of the rear substrate (such that a coating over a large area of the rear or fourth surface of the rear substrate is viewable through the portions or regions that are devoid of the third surface mirror reflector). For example, the third surface mirror reflector may be removed or not established around the periphery of the spotter mirror region (or optionally from the entire spotter mirror region and an area outside of and around the spotter mirror region) and the fourth or rear surface of the rear substrate may be coated with an opaque or colored coating, such that the opaque or colored coating at the rear surface of the rear substrate is viewable through the front substrate and through the portion of the third substrate that is devoid of the third surface reflector (and that is not behind the spotter mirror reflector).

Thus, the spotter mirror, such as a circular ground in concave recess established at the rear surface of the glass substrate of the mirror reflective element, may be selectively covered and exposed and optionally demarcated to provide the desired size and shape and appearance of the spotter mirror. In single substrate mirror applications (such as fixed reflectance mirror reflective elements), the mirror reflector coating may be established on the front or outer or first surface of the reflective element substrate (opposite from the ground rear or second surface at which the ground in spotter mirror is established), and may be applied over a portion of the spotter mirror shape to provide only a partial or semi-circular spotter mirror. Optionally, other means for covering or hiding part of the circular spotter mirror recess may be implemented. For example, the ground in concave surface of the spotter mirror may have a reflector coating established only at part (such as about half or a little over half or a little less than half) of the concave surface, so that the non-reflector-coated portion does not provide the wide angle spotter mirror function and only the coated portion provides the wide angle spotter mirror function.

Optionally, the mirror reflective element may comprise a variable reflectance reflective element, such as an electro-optic or electrochromic reflective element having a front glass substrate (with a concave spotter mirror shape ground or formed at a rear surface thereof) and a rear substrate (with a mirror reflector established at a surface thereof, such as at the front or third surface of the rear substrate) with an electro-optic medium sandwiched therebetween. The concave spotter mirror shape is reflector coated to provide the spotter mirror function, and, in accordance with the present invention, the spotter mirror shape or surface may be partially reflector coated, leaving a portion of the spotter mirror shape (such as an inboard half or thereabouts) uncoated, whereby the principal mirror reflector at the rear substrate will be viewable through the non-coated portion, so that only the reflector coated portion of the spotter mirror shape will provide the wide angle spotter mirror function. Other means of at least partially or substantially blocking or hiding (or not reflecting) a portion of the spotter mirror shape may be implemented while remaining within the spirit and scope of the present invention. Optionally, the curved concave recess may be established (and reflector coated) at the rear or fourth surface of the rear glass substrate of a laminate type electro-optic mirror reflective element assembly, with the principal reflector established at the front or third surface of the rear glass substrate (such as by utilizing aspects of the reflective element assemblies described in U.S. Pat. No. 8,021,005, which is hereby incorporated herein by reference in its entirety) and partially overlapping the reflector-coated concave recess at the fourth surface.

Figure 15:
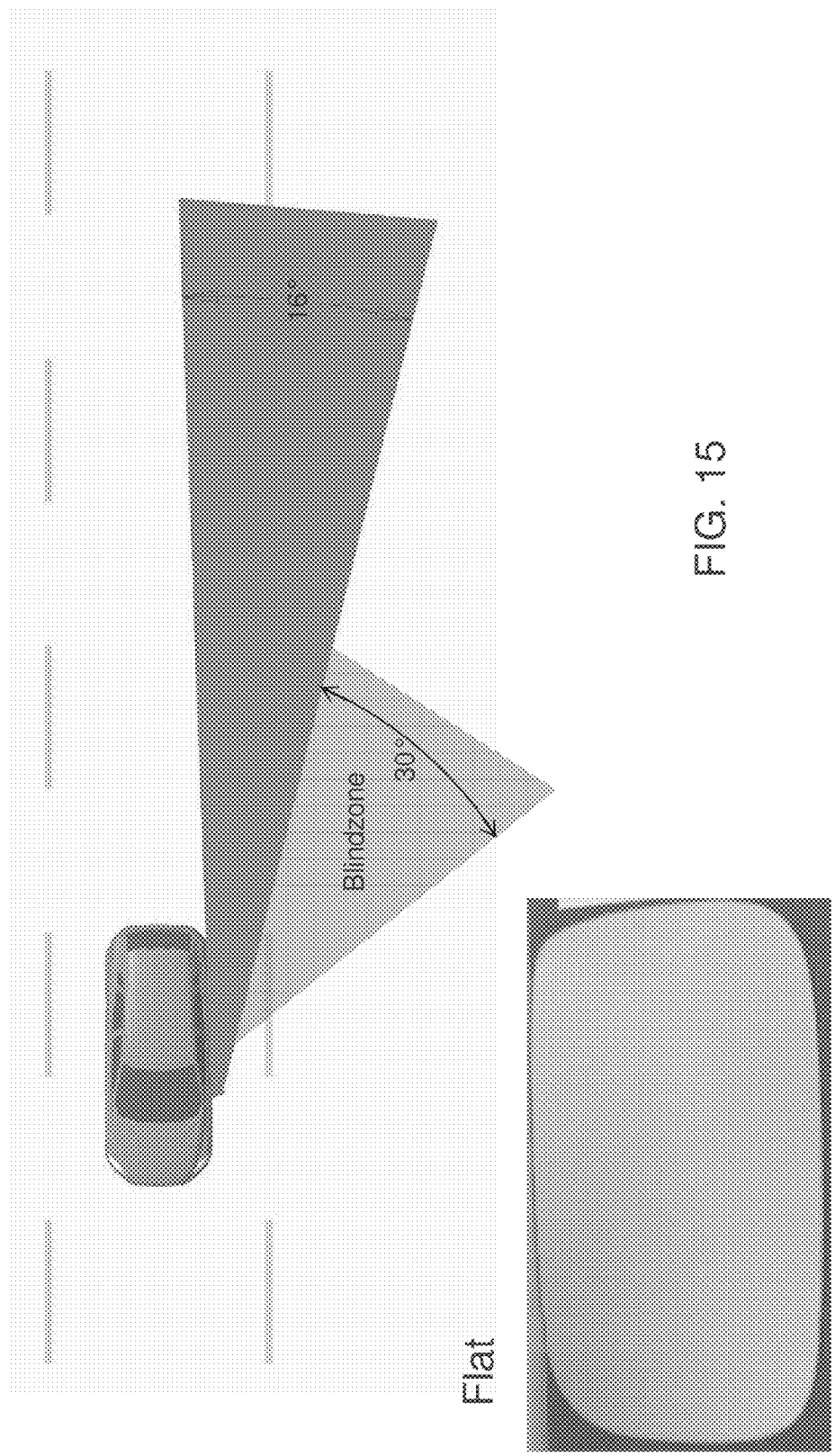
FIG. 15 is a schematic showing a vehicle's blind zone area and the rearward field of view provided by a substantially planar mirror reflective element.
Figure 16:
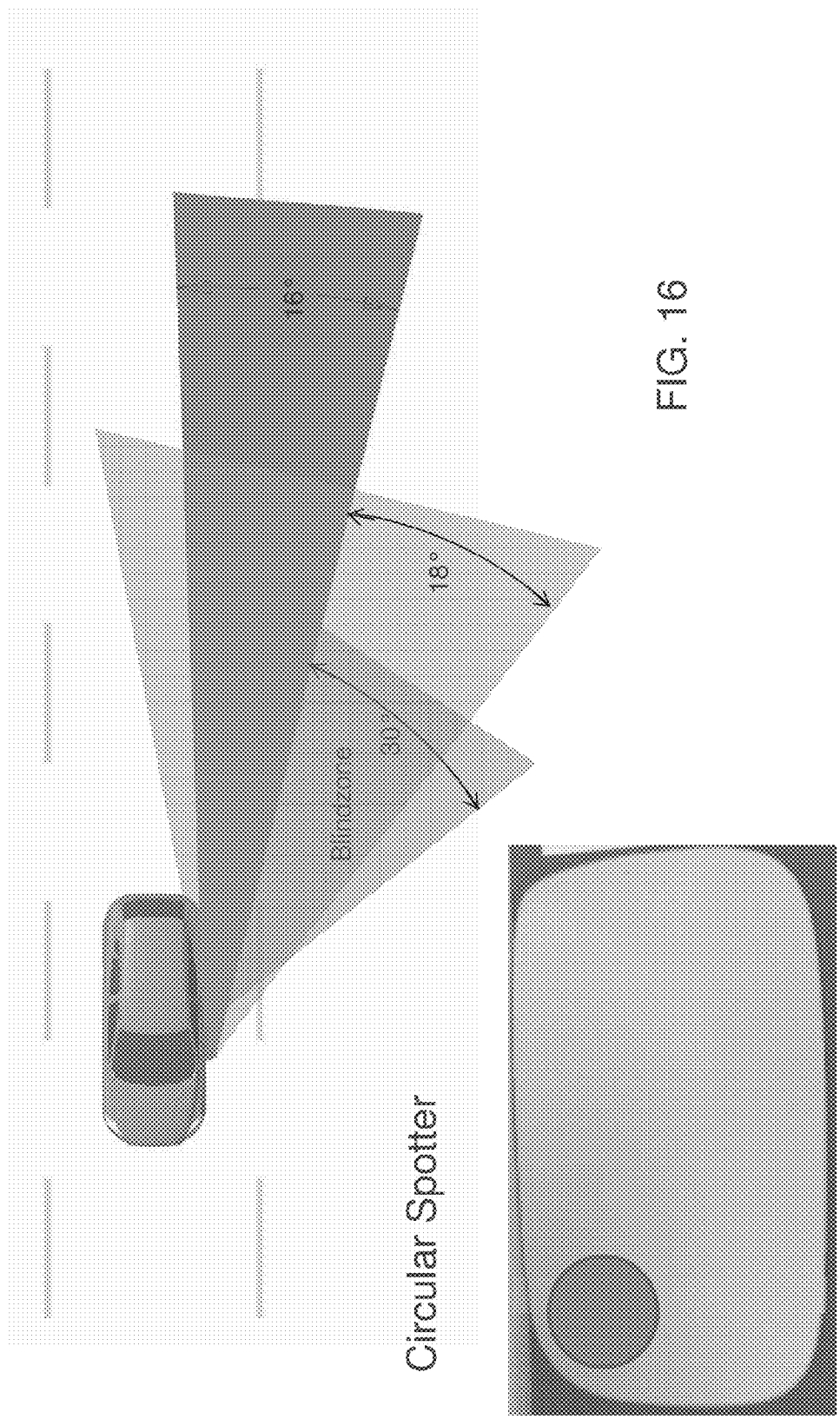
FIG. 16 is a schematic showing a vehicle's blind zone area and the rearward field of view provided by a substantially planar mirror reflective element and by a circular spotter mirror established thereat.

Thus, the mirror reflective element of the present invention provides a spotter mirror that is shaped or formed or configured to provide a desired wide angle view of the blind zone at the side of the vehicle, while not including in its field of view the area alongside the vehicle that is already encompassed by the principal mirror portion of the reflective element. As shown in FIG. 15, a vehicle exterior driver side mirror may have a field of view that is, for example, approximately 16 degrees outboard of the side of the vehicle, such that a blind zone is located in a range of, for example, about 30 degrees outboard of the field of view of the mirror reflective element. With reference to FIG. 16, when a circular spotter mirror is provided at the reflective element, the spotter mirror has a field of view that encompasses a portion of the blind zone (as desired) but that also encompasses the region that is already encompassed by the principal reflector portion of the exterior mirror assembly. Such a mirror provides reflected images to the driver similar to those shown in FIG. 2, discussed above.

Figure 17:
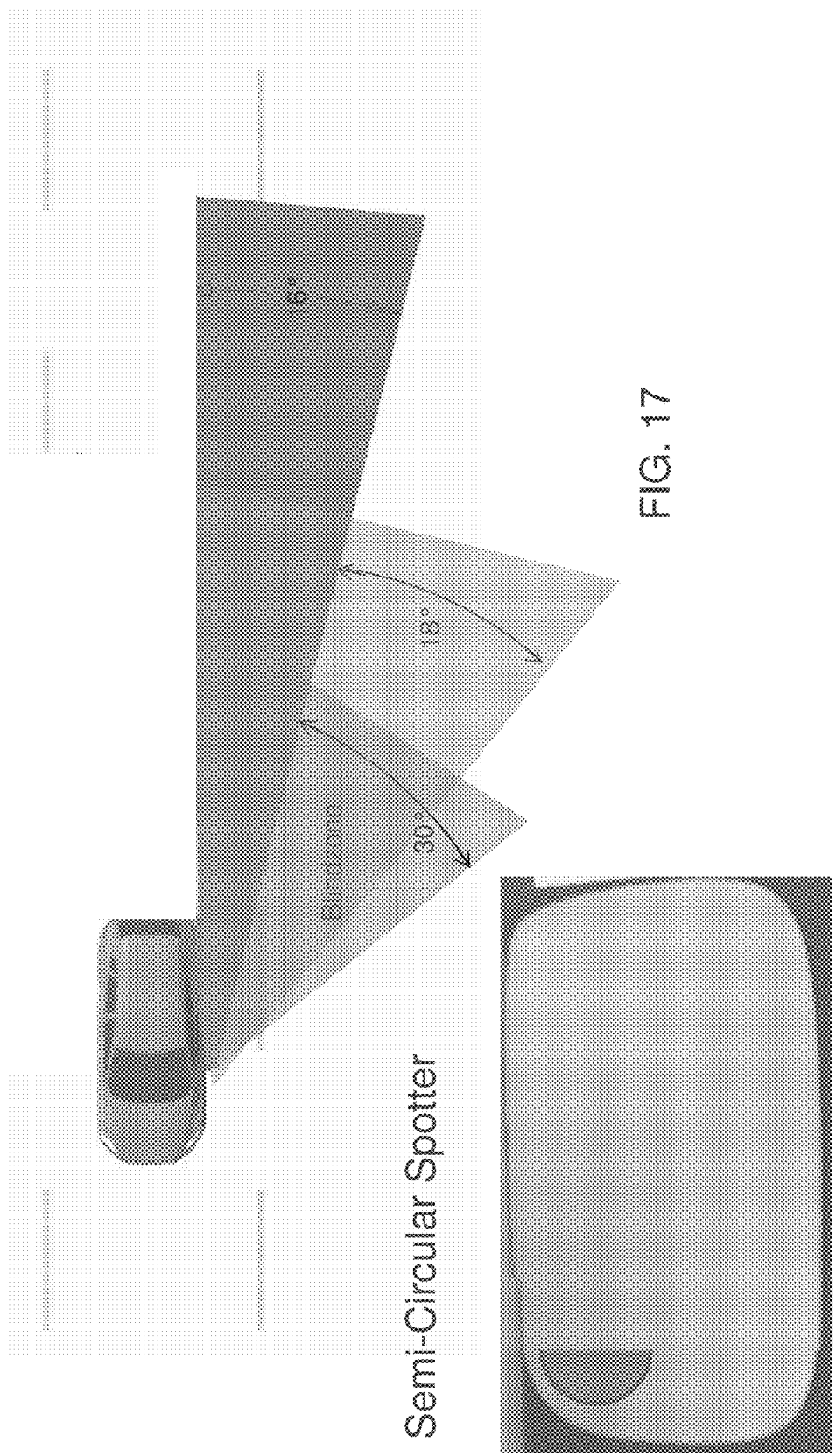
FIG. 17 is a schematic showing a vehicle's blind zone area and the rearward field of view provided by a substantially planar mirror reflective element and by a semi-circular spotter mirror established thereat in accordance with the present invention.

The present invention tailors or configures the spotter mirror to reduce the redundancy of the reflected regions. For example, and with reference to FIG. 17, the field of view of the semi-circular spotter mirror of the present invention does not encompass the region that is already covered or encompassed by the principal reflective region or portion of the reflective element, and instead provides a wide angle field of view of a substantial portion of the blind zone at the side of the vehicle and outboard of the region encompassed by the field of view of the principal mirror reflector.

Thus, the present invention provides a tailored or targeted or focused spotter mirror feature that provides a wide angle field of view at only a portion of the area sideward of the vehicle. The present invention thus provides an enhanced wide angle view to the driver of the vehicle, whereby the driver only views (at the spotter region of the mirror) the area at the side of the vehicle that is of interest to the driver, such as the blind zone area or the like. The present invention also provides a demarcation line or element at or around the ground in or integral spotter mirror element or concave recess or the like to further enhance the viewability and discernibility of the spotter mirror to the driver of the vehicle.

Optionally, a heater pad may be disposed at the rear surface of the reflective element to provide heat at the mirror reflective element to defrost or defog or demist the mirror reflective element at the principal reflecting area and at the spotter reflector area. The heater pad or element at the rear surface of the glass substrate may comprise a mirror defrost/demisting heater such as a heater pad or a heater film or a heater element, and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent application Ser. No. 11/779,047, filed Jul. 17, 2007, and published Jan. 17, 2008 as U.S. Pat. Publication No. 20080011733; and/or Ser. No. 13/111,407, filed May 19, 2011, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

As discussed above, the rearview mirror reflective element assembly of the present invention may comprise an electro-optic or electrochromic reflective element assembly or cell, such as an electrochromic mirror reflective element assembly with coated substrates that are coated utilizing principles disclosed in commonly assigned U.S. Pat. Nos. 7,310,178;

7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly that receives or incorporates the mirror reflective element assembly or cell constructed in accordance with the present invention.

Typically, the material for the substrates comprises glass, such as soda-lime glass or the like, but other materials, such as polycarbonate or other polymeric materials may be utilized without affecting the scope of the present invention. The completed mirror cells or reflective element assemblies include a front substrate and a rear substrate. The rear substrate may have a reflective coating on its front surface (toward the front substrate when the substrates are sandwiched together, and typically referred to as the third surface of the mirror reflective element assembly), while the front substrate may have a transparent semiconductive coating, such as a coating of indium tin oxide (ITO) or doped indium tin oxide or the like, on its rear surface (toward the rear substrate when the substrates are sandwiched together, and typically referred to as the second surface of the mirror reflective element assembly).

Optionally, the substrate surface of the front and/or rear substrates may be initially coated with a transparent electrically conductive coating, such as a low cost tin oxide coating or the like, such as the types described in U.S. Pat. Nos. 6,420,036; 6,245,262; 6,154,306; and/or 5,724,187, which are hereby incorporated herein by reference in their entireties. For example, a mirror assembly manufacturer may purchase tin oxide-coated glass substrates or sheets, such as sold by the LOF Glass division of Libbey-Owens-Ford Co., Toledo, Ohio under the trade name of "TEC-Glass" products, such as "TEC 10" (10 ohms per square sheet resistance), "TEC 12" (12 ohms per square sheet resistance), "TEC 15" (15 ohms per square sheet resistance) and "TEC 20" (20 ohms per square sheet resistance) tin oxide-coated glass and the like. Moreover, tin oxide coated glass substrates, such as commercially available from Pittsburgh Plate Glass Industries, Pittsburgh, Pa. under the "SUNGATE" trade name, may be advantageously employed herein.

Optionally, the cells manufactured by the process of the present invention may have generally or substantially flush edges or offset edges or overhang regions or the like, while remaining within the spirit and scope of the present invention, such as the types of cells described in U.S. Pat. Nos. 7,274, 501; 7,184,190 and/or 7,255,451, which are hereby incorporated herein by reference in their entireties, or may have other forms or shapes, such as the mirror shapes described in U.S. Pat. No. 7,110,156, and/or shown in U.S. Design Pat. Nos. D493,131 and/or D493,394, which are hereby incorporated herein by reference in their entireties.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; 4,793,690; and/or 7,004,593, which are hereby incorporated herein by reference in their entireties) at the rear or fourth surface of the reflective element assembly, such that the photo sensor detects light passing through the reflective element assembly. Examples of such configurations are described in U.S. Pat. Nos. 4,793,690; 5,550,677; 5,193,029 and/or 7,004,593, which are all hereby incorporated herein by reference in their entireties. The reflective element assembly thus may have a window or transmissive port or portion at the photo sensor or, and preferably, may comprise a transflective display on demand (DOD) type reflective element assembly or cell, such as, for example, the types described in U.S. Pat. Nos. 5,668, 663; 5,724,187; 6,690,268; 7,195,381; 7,274,501; 7,255,451 and/or 7,184,190, which are all hereby incorporated herein by reference in their entireties. The transflective reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Changes and modifications in the specifically described embodiments may be carried out without departing from the principles of the present invention, which is intended to be limited only by the scope of the appended claims, as interpreted according to the principles of patent law.

The invention claimed is:

1. A rearview mirror reflective element assembly for an exterior mirror assembly of a vehicle, said mirror reflective element assembly comprising:

a mirror reflective element, said mirror reflective element comprising a principal mirror and an auxiliary wide angle spotter mirror; and a generally circular curved recess established at a spotter portion of a rear surface of a glass substrate of said mirror reflective element, wherein said curved recess comprises a concave recess established at said rear surface of said glass substrate;

wherein a spotter mirror reflector coating is established at at least a portion of said curved recess to establish said auxiliary wide angle spotter mirror;

wherein a principal mirror reflector coating is established at a front surface of said mirror reflective element to establish said principal mirror; and wherein one of (i) a portion of said curved recess is substantially not coated with said spotter mirror reflector coating and (ii) a portion of said spotter mirror reflector coating at said curved recess is at least partially hidden from view of a person viewing the front of said mirror reflective element by an overlapping portion of said principal mirror reflector coating.

2. The mirror reflective element assembly of claim 1, wherein a portion of said spotter mirror reflector coating at said curved recess is at least partially hidden from view of a person viewing the front of said mirror reflective element by an overlapping portion of said principal mirror reflector coating.

3. The mirror reflective element assembly of claim 2, wherein said principal mirror reflector coating is established at a front or first surface of said glass substrate and wherein said portion of said curved recess is at least partially hidden by said principal mirror reflector coating.

4. The mirror reflective element assembly of claim 2, wherein said portion of said spotter mirror reflector coating at said curved recess is at least partially hidden from view of a person viewing the front of said mirror reflective element by an opaque coating established at a front surface of said mirror reflective element.

5. The mirror reflective element assembly of claim 1, wherein said mirror reflective element comprises a single glass substrate and wherein said principal mirror reflector coating is established at a front surface of said single glass substrate.

6. The mirror reflective element assembly of claim 1, wherein a portion of said curved recess is substantially not coated with said spotter mirror reflector coating.

7. The mirror reflective element assembly of claim 1, wherein said mirror reflective element comprises an electro-optic mirror reflective element and wherein said glass substrate comprises a front glass substrate of said electro-optic mirror reflective element and wherein said electro-optic mirror reflective element further comprises a rear glass substrate and an electro-optic medium disposed between said front glass substrate and said rear glass substrate, and wherein said principal mirror reflector coating is established at a front surface of said rear glass substrate.

8. The mirror reflective element assembly of claim 7, wherein a portion of said curved recess is substantially not coated with said spotter mirror reflector coating.

9. The mirror reflective element assembly of claim 7, wherein a demarcation is established at least partially around said auxiliary wide angle spotter mirror, and wherein said demarcation is established at least in part by a transparent region of said front glass substrate that is devoid of said spotter mirror reflector coating.

10. The mirror reflective element assembly of claim 9, wherein said demarcation is established by an opaque coating at a surface of said rear glass substrate, and wherein said opaque coating is different than said principal mirror reflector coating.

11. The mirror reflective element assembly of claim 1, wherein a demarcation is established at least partially around said auxiliary wide angle spotter mirror.

12. The mirror reflective element assembly of claim 11, wherein said demarcation is established by a transparent region of said glass substrate that is devoid of said principal mirror reflector coating and said spotter mirror reflector coating.

13. A rearview mirror reflective element assembly for an exterior mirror assembly of a vehicle, said mirror reflective element assembly comprising:
 a mirror reflective element comprising a generally planar glass substrate,
 said mirror reflective element comprising a principal mirror and an auxiliary wide angle spotter mirror and
 a generally circular curved recess established at a spotter portion of a rear surface of said glass substrate of said mirror reflective element, wherein said curved recess comprises a concave recess established at said rear surface of said glass substrate;
 wherein a spotter mirror reflector coating is established at said curved recess to establish said auxiliary wide angle spotter mirror;
 wherein a principal mirror reflector coating is established at a front surface of said glass substrate to establish said principal mirror;
 wherein a portion of said spotter mirror reflector coating at said curved recess is at least partially hidden from view of a person viewing the front of said mirror reflective element by a coating of said mirror reflective element; and
 wherein said portion of said spotter mirror reflector coating is less than or equal to about half of said spotter mirror reflector coating at said curved recess.

14. The mirror reflective element assembly of claim 13, wherein said portion of said spotter mirror reflector coating comprises an inboard portion of said spotter mirror reflector coating.

15. The mirror reflective element assembly of claim 13, wherein a demarcation is established at least partially around said auxiliary wide angle spotter mirror.

16. The mirror reflective element assembly of claim 15, wherein said demarcation is established by a transparent region of said glass substrate that is devoid of said principal mirror reflector coating and said spotter mirror reflector coating.

17. A rearview mirror reflective element assembly for an exterior mirror assembly of a vehicle, said mirror reflective element assembly comprising:
 a mirror reflective element comprising a generally planar glass substrate,
 said mirror reflective element comprising a principal mirror and an auxiliary wide angle spotter mirror and
 a generally circular curved recess established at a spotter portion of a rear surface of said glass substrate of said mirror reflective element, wherein said curved recess comprises a concave recess established at said rear surface of said glass substrate;
 wherein a spotter mirror reflector coating is established at said curved recess to establish said auxiliary wide angle spotter mirror;
 wherein a principal mirror reflector coating is established at a front surface of said glass substrate to establish said principal mirror;
 wherein a portion of said curved recess is substantially not coated with said spotter mirror reflector coating; and
 wherein said portion of said curved recess is less than or equal to about half of said curved recess.

18. The mirror reflective element assembly of claim 17, wherein said portion of said curved recess comprises an inboard portion of said curved recess.

19. The mirror reflective element assembly of claim 17, wherein a demarcation is established at least partially around said auxiliary wide angle spotter mirror.

20. The mirror reflective element assembly of claim 19, wherein said demarcation is established by a transparent region of said glass substrate that is devoid of said principal mirror reflector coating and said spotter mirror reflector coating.

* * * * *